Patented Nov. 7, 1933

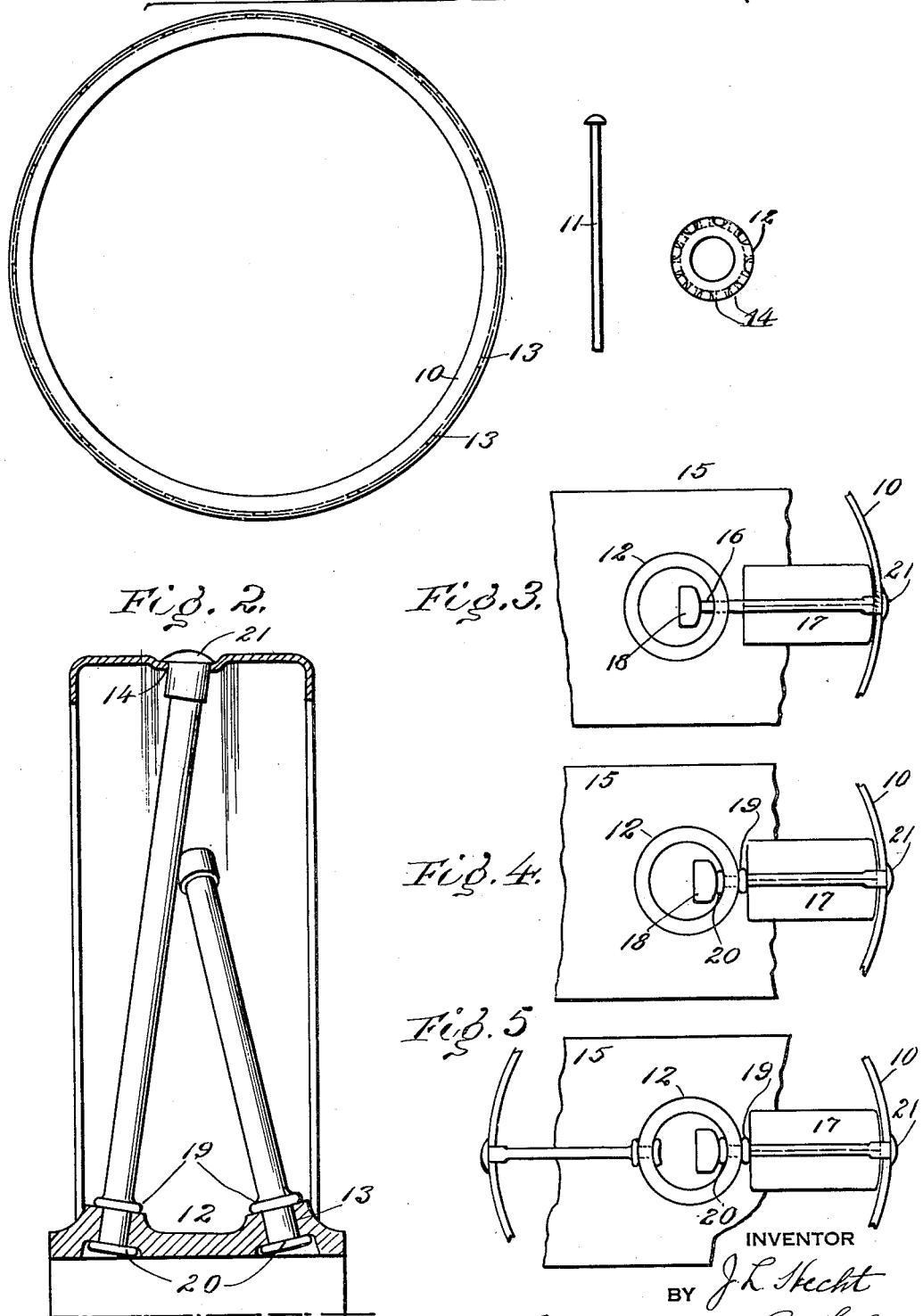

1,934,537

UNITED STATES PATENT OFFICE 1,934,537

METHOD OF MAKING TENSION WHEELS

Joseph L. Hecht, Davenport, Iowa, assignor to French & Hecht, Incorporated, a corporation of Iowa Application February 5, 1932. Serial No. 591,045

5 Claims. (Cl. 29—159.02)

This invention relates to a method of manufacturing metal wheels and more particularly to wheels of this type wherein the spokes are under tension.

An object of the invention is to produce a metal tension wheel by progressively inserting spokes headed at one end through corresponding holes in the rim and hub, upsetting the other end of the spoke endwise to secure it, firmly to one of the wheel elements, the last spoke inserted causing all of the spokes to seat and become properly tensioned, and the hub and rim members concentrically positioned, the whole series of operations being carried out without previously requiring the hub and rim elements to be fixedly secured in exact concentric relation.

A feature of the invention resides in permitting one of the wheel elements to be freely movable and initially positioning the other in substantially concentric relation therewith. Headed spokes are progressively inserted through corresponding holes in the rim and hub (in the preferred embodiment of the invention the headed end being adjacent the rim) and a die clamped to each spoke in turn, which acts to hold the rim in position and assists in the forming of a head and shoulder at the hub, thus fastening the spoke securely thereto. The formation of the head and shoulder is effected by upsetting the headless end of the spoke. This produces a shortening of the spoke which displaces the hub toward the rim and as each spoke is inserted the rim gradually assumes a concentric position with respect to the hub, until upon the insertion of the last spoke the rim and hub become absolutely concentric, all of the spoke heads seated at the rim and pressure applied thereat so as to tension the spokes. In this way the tension wheel is produced.

Other objects of the invention will in part be obvious and will in part appear hereinafter.

The invention accordingly comprises the several steps, and the manner of assembling the various parts which will be exemplified in the method hereinafter set forth and the scope of the application of which will be indicated in the claims.

For a fuller understanding of the nature and objects of the invention reference should be had to the following detailed description taken in connection with the accompanying drawing, in which:

Fig. 1 is a side elevation showing the disassembled parts or members of a wheel of a form suitable for practicing the method of the invention;

Fig. 2 is a sectional view of the finished wheel on an enlarged scale, showing the head of the spoke seated at the rim, and the shoulder and head formation at the hub, and Figs. 3 to 5 are diagrammatical illustrations of the steps involved in forming the wheel.

Referring to the drawing, Fig. 1 shows the component parts of the wheel consisting of metal rim 10, headed spoke 11 and hub 12. The rim and hub elements are provided with corresponding spoke holes 13 and 14 through which the spokes are inserted, the hub, of course, being finally secured concentrically within the wheel.

Referring to Figs. 3 to 5, a radially movable table or floating platform 15 is provided upon which the hub 12 is fixedly secured. Means is also provided for supporting the rim 10 in substantially concentric non-fixed relation with the hub, but as this means is not necessary to a complete understanding of the invention, it has not been shown in the drawing. If desired, the table 15 in addition to being movable radially, may also be rotatable, as might also the means supporting the rim, so that both may be turned around to present the spokes in succession to the spoke fastening units to be later described.

In assembling the wheel, the headless end of the spoke 11 is inserted through the corresponding holes 13 and 14 in the rim and hub, the headless end 16 projecting inwardly for some distance beyond the inner side of the hub, and being preferably heated either before or after it is placed in position. A clamping die 17 is provided for securely holding the spoke and for assisting in the formation of the head and shoulder at the hub. The die further assists in supporting the rim 10 in position during the fastening of the spoke.

A head and shoulder forming tool 18 is positioned inside the hub and so cooperates with the die 17 when moved toward it with sufficiently high pressure, that the heated end of the spoke is upset endwise to form the shoulder 19 on the outside of the hub, and the head 20 on the inside of the hub (Fig. 4), the spoke in this manner being firmly secured to the hub. The material of the spoke going into the formation of the head 20 and shoulder 19 causes a shortening of the spoke, but as the die 17 remains stationary, the shortening causes a displacement of the hub member toward the die and the rim member. This displacement is permitted by the floating table 15 to which the hub member is clamped as shown in Fig. 4.

The die 17 and the forming tool 18 are then removed, a new spoke positioned in the next adjacent holes in rim and hub, and the same process repeated, and so on, progressively around the wheel until it is completed. As each spoke is fastened firmly to the hub, the floating table 15 permits the hub to move forward, and as each successive spoke is inserted in the hub, the rim will gradually assume a concentric position with the hub, until the last spoke is put in, when the hub and rim become absolutely concentric, and the rim pulled inwardly, resulting in a pressure by the rim under all the spoke heads and thereby producing a tension wheel. In the preferred manner of carrying out the invention, in which the spoke ends will be heated to facilitate upsetting, the spokes will be of such length that the contraction, resulting from passing from a hot to a cold state, will finally seat the rim tightly under the outer spoke heads, the last spoke inserted completely putting all the spokes under tension.

The amount of the displacement of the hub toward the rim during the assembly of the wheel, due to the formation of the head and shoulder and also due to the contraction of the metal itself upon cooling, may be so great as to require a small space left between the head and the outside of the rim, in order that the tension applied to the spokes upon the insertion and fastening of the last few will not be so great as to deform and weaken the finished wheel. Obviously, as the insertion of the spokes progresses, the displacement of the hub toward the rim at the particular spoke being acted upon, gradually seats the heads of all of the previously inserted spokes firmly against the rim until the final spoke is inserted, at which time the rim is moved to absolute concentricity with the hub, all the spoke heads seated and equal tension applied to the spokes.

The amount of the spacing previously referred to, depends upon the following factors, namely, the amount that the spoke is shortened during the formation of the head and shoulder, at the hub, the amount of contraction upon cooling of the metal, and the amount of tension desired in the spokes of the completed wheel. It is conceivable, of course, that the relation of these factors in some wheels may be such that no spacing or tolerance is required at all.

Fig. 2 shows a sectional portion of a completed wheel with the head 21 firmly seated upon the rim 10, and the other end of the spoke fastened to the hub by the shoulder 19 and head 20.

It is not essential to the practice of the invention that in the fastening of the free end of the spoke to the adjacent wheel member, there be formed both a head on the end of the spoke to bear against one side of the wheel member and an adjacent shoulder to bear against the other side of the wheel member, since it is obvious that the spoke may be fastened to the wheel member by an upsetting in other ways. For instance, the end of the spoke may be headed and the spoke stock caused by the heading operation to expand laterally and tightly fill the spoke hole, or an enlarged portion of the same, whereby the spoke will be shortened as before, which, together with contraction of the metal on cooling, will cause a relative displacement of the wheel members toward each other as in the example heretofore described, at the same time, however, affording a firm and secure connection of the spoke with the wheel, and without the provision of the external shoulder.

In describing the method of this invention, the hub element has been described as the one connected to the movable or floating table, but this is not necessarily so, as the rim element of the wheel could be made the movable one, and the head and shoulder formed adjacent this element.

Furthermore, while the preferable method of procedure has been described as involving hot working of the spoke elements, the invention is not limited thereto, but embraces as well the cold working of the parts, i. e., the spokes could be fastened in place by upsetting without previously heating the end upon which the upsetting tool acts, although this is not as easy or as practicable as when the parts are worked hot.

Since certain changes may be made in the above method without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. The method of making tension wheels having a closed rim member and hub member which comprises positioning the hub member within the rim member, permitting one of said members to be freely movable, inserting the headless ends of headed spoke members one at a time through corresponding holes in said members, and acting upon the ends of the spokes adjacent the freely movable member to shorten the same and fasten them securely to the movable member, whereby the insertion of the last spoke by the shortening thereof and the coaction of its head with the rim will automatically adjust the tension of all the spokes and render the hub member and the rim concentric.

2. The method of making tension wheels having a closed rim member and hub member which comprises positioning the hub member within the rim member, permitting one of said members to be freely movable, progressively inserting the headless ends of headed spoke members through corresponding holes in said members, acting upon the ends of the spokes adjacent the movable member to form parts on the spokes on opposite sides of the movable member, whereby to shorten and fasten the spokes securely to said member, the last of the spokes to be acted upon causing said movable member to assume a fixed concentric position with respect to the other member and by its shortening and the coaction of its head with the rim automatically to adjust the tension in all the spokes.

3. The method of making tension wheels having a closed rim member and hub member which comprises positioning the hub member within the rim member, permitting one of said members to be freely movable, inserting the headless end of a headed spoke member through corresponding holes in said member with the headless end adjacent the movable member, upsetting said headless end in such manner as to form parts on the spoke on opposite sides of the movable member whereby firmly to secure said spoke member to the movable member, said upsetting action resulting in a shortening of the spoke and a displacement of said movable member, progressively inserting similar spokes in said members in like manner to complete the wheel, the insertion of the last spoke and the accompanying movement of the movable member acting to position the hub and rim member concentrically of each other, and to seat the spokes and place them under tension.

4. The method of making tension wheels having a closed rim member and hub member which comprises positioning the hub member within the rim member with the hub member freely movable, inserting the headless end of a headed spoke member through a hole in the rim member and then through a hole in the hub member, clamping the spoke outside of the hub member, applying pressure to the end of the spoke within the hub, to upset said spoke endwise and dispose the metal thereof on both sides of the hub so as to secure said spoke firmly to the hub, said upsetting action being accompanied by a displacement of the hub toward the clamp, progressively inserting similar spokes in said rim and hub members in like manner to complete the wheel, the insertion of the last spoke and the accompanying movement of the hub member acting to position it concentrically of the rim, seat the spokes and place them under tension.

5. The method of making tension wheels which consists in assembling a hub having spoke holes, within a closed freely movable rim having spoke holes, providing spokes having each a head at one end, inserting the headless end of a spoke through a hole in the rim and the corresponding hole in the hub, the inner end of said spoke being heated either before or after insertion, holding the spoke at a point between the rim and hub, upsetting the inner heated end of the spoke within the hub while advancing the hub toward the rim in the upsetting operation, thereby forming parts on the spoke on opposite sides of the hub and thereby fastening the spoke to the hub, and repeating said operations on successive spokes, the length of the spokes being such that on the fastening of the last spoke in place, the rim will be brought into true concentric relation to the hub, and the spokes in passing from the hot to the cold state will be placed under uniform tension, with the heads on the outer ends of the spokes seated tightly against the outer surface of the rim.

JOSEPH L. HECHT.